(12) United States Patent
Elmaleh (10) Patent No.: US 7,466,044 B2
(45) Date of Patent: Dec. 16, 2008

(54) ELECTRO-MAGNETIC CIRCULAR ENGINE

(76) Inventor: Shimon Elmaleh, 7425 SW. 109th Ter., Pinecrest, FL (US) 33156

( * ) Notice: Subject to any disclaimer, the term of this patent is extended or adjusted under 35 U.S.C. 154(b) by 421 days.

(21) Appl. No.: 11/406,115

(22) Filed: Apr. 18, 2006

(65) Prior Publication Data

US 2008/0231124 A1     Sep. 25, 2008

(51) Int. Cl.
*H02K 37/00* (2006.01)
*H02K 16/00* (2006.01)
*H02K 23/66* (2006.01)

(52) U.S. Cl. .................. 310/46; 310/70 R; 310/99; 310/114; 310/177; 180/65.1

(58) Field of Classification Search .......... 310/114, 310/199, 254, 165, 46, 153, 48, 177, 99, 310/70 R
See application file for complete search history.

(56) References Cited

U.S. PATENT DOCUMENTS

| | | | | |
|---|---|---|---|---|
| 788,291 A | * | 4/1905 | Titzel | 310/46 |
| 1,497,668 A | * | 6/1924 | Broluska | 310/40 R |
| 1,546,720 A | * | 7/1925 | Davis | 310/46 |
| 3,983,426 A | * | 9/1976 | Kilmer | 310/46 |
| 4,214,178 A | * | 7/1980 | Tippner | 310/14 |
| 4,358,693 A | * | 11/1982 | Palmer et al. | 310/46 |
| 4,749,893 A | * | 6/1988 | Reynolds | 310/24 |
| 5,233,251 A | * | 8/1993 | Nehmer | 310/167 |
| 6,278,204 B1 | * | 8/2001 | Frenette | 310/24 |
| 6,504,285 B2 | * | 1/2003 | Yun | 310/261 |

FOREIGN PATENT DOCUMENTS

GB     2265498     * 9/1993
JP     4-117160    * 9/1990

* cited by examiner

*Primary Examiner*—Burton Mullins
(74) *Attorney, Agent, or Firm*—Albert Bordas, P.A.

(57) ABSTRACT

An electro-magnetic circular engine in which the motive force is electro-magnetism. The electro-magnetic circular engine comprises a hub assembly, first and second electro-magnetic wheels, electro-magnetic means, and electrical means. The electro-magnetic circular engine includes the rotation of the hub assembly in a predetermined direction continuously after the initial activation of the hub assembly by assembly of applying a short period of the external force, such as from a starter. At least three alternators are connected to the rotating shaft and work at a minimum of 35 amps to over 600 amps each and recharge batteries.

3 Claims, 6 Drawing Sheets

ELECTRO-MAGNETIC CIRCULAR ENGINE

BACKGROUND OF THE INVENTION

1. Field of the Invention

The present invention relates to engines, and more particularly, to circular engines in which the motive force is electro-magnetism.

2. Description of the Related Art

Electro-magnetic systems comprise the basic principle that opposite poles attract and like poles repel each other. There are no electro-magnetic circular engines to the best of applicant's knowledge that include the rotation of a hub assembly in a predetermined direction continuously after the initial activation of the hub assembly by means of applying a short period of a force.

Applicant believes that the only prior art reference corresponds to Applicant's own patent application having Ser. No. 10/987,701 for Electro-magnetic engine, filed on Nov. 15, 2004, that was granted a notice of allowance on Nov. 10, 2005.

SUMMARY OF THE INVENTION

An electro-magnetic circular engine, comprising a hub assembly and a first electro-magnetic wheel rotatably mounted on the hub assembly. The first electro-magnetic wheel comprises first electro-magnets. A second electro-magnetic wheel surrounds the first electro-magnetic wheel and comprises second electro-magnets.

The instant invention also has electro-magnetic means consisting of a distributor having first synchronizing means to send an electrical current to the first and second electro-magnets. The electro-magnetic means generate an electro-motive force between the first and second electro-magnets when synchronized by the distributor, wherein engaging magnetic polarity between the first and second electro-magnets, forces the first electro-magnetic wheel to rotate with the hub assembly in a predetermined direction continuously after an initial activation of the electro-magnetic means. This is done by applying a short period of an electrical force to the hub assembly. The instant invention also comprises electrical means that comprise an electrical connection and a source of rechargeable battery power for supplying the rechargeable battery power for the short period of an electrical force.

The electro-magnetic circular engine may further comprise a third electro-magnetic wheel rotatably mounted on the hub assembly. The third electro-magnetic wheel comprises third electro-magnets. In this embodiment, the electro-magnetic means further has second synchronizing means to send an electrical current to the first, second, and third electro-magnets. The electro-magnetic means generate the electro-motive force between the first, second, and third electro-magnets when synchronized by the distributor, wherein engaging magnetic polarity between the first, second, and third electro-magnets forces the first and third electro-magnetic wheels to rotate with the hub assembly in a predetermined direction continuously after an initial activation of the electro-magnetic means. This is done by applying the short period of the electrical force.

The electro-magnetic circular engine may further comprise a fourth electro-magnetic wheel surrounding the third electro-magnetic wheel. The fourth electro-magnetic wheel comprises fourth electro-magnets. In this embodiment, the electro-magnetic means further has third synchronizing means to send an electrical current to the first, second, third, and fourth electro-magnets. The electro-magnetic means generate the electro-motive force between the first, second, third, and fourth electro-magnets when synchronized by the distributor, wherein engaging magnetic polarity between the first, second, third, and fourth electro-magnets forces the first and third electro-magnetic wheels to rotate with the hub assembly in a predetermined direction continuously after an initial activation of the electro-magnetic means. This is done by applying the short period of the electrical force.

The first, second, third, and fourth electro-magnets each comprise sensors to receive the electrical current via the electro-magnetic means. The electrical means further comprises the source of rechargeable battery power having the electrical connection to a starter switch. The electrical means further comprises the starter switch having the electrical connection to a starter. The electrical means further comprises the starter switch having the electrical connection to at least one electrical coil. The electrical coil is an inverter, and has means to convert 24 volts DC to 240 volts AC. The electrical means further comprises the at least one electrical coil having the electrical connection to a mechanical pedal that is operated by a driver for acceleration. The mechanical pedal has the electrical connection to an electric accelerator. The mechanical pedal has the electrical connection to a computer. The computer has the electrical connection to the distributor, and the short period of an electrical force derives from a starter.

The electro-magnetic circular engine further comprises at least three alternators connected to the hub assembly. The at least three alternators work at a minimum of 35 amps to over 600 amps each and recharge the rechargeable battery power. The first, second, third, and fourth electro-magnets requires scheduled maintenance and replacement at predetermined time intervals to maintain predetermined the electro-motive forces. The electro-magnetic circular engine set forth in claim 10, further comprises a cooling system and an engine oil system for lubrication and cooling.

It is therefore one of the main objects of the present invention to provide an electro-magnetic circular engine in which the motive force is electro-magnetism.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Referring now to the drawings, an electro-magnetic circular engine is shown at 10. In the preferred embodiment, the electro-magnetic circular engine consists of hub assembly 20, electro-magnetic wheel 30, electro-magnetic wheel 50, and electrical system 100, as seen in FIGS. 1A and 1B.

Figure 1A:
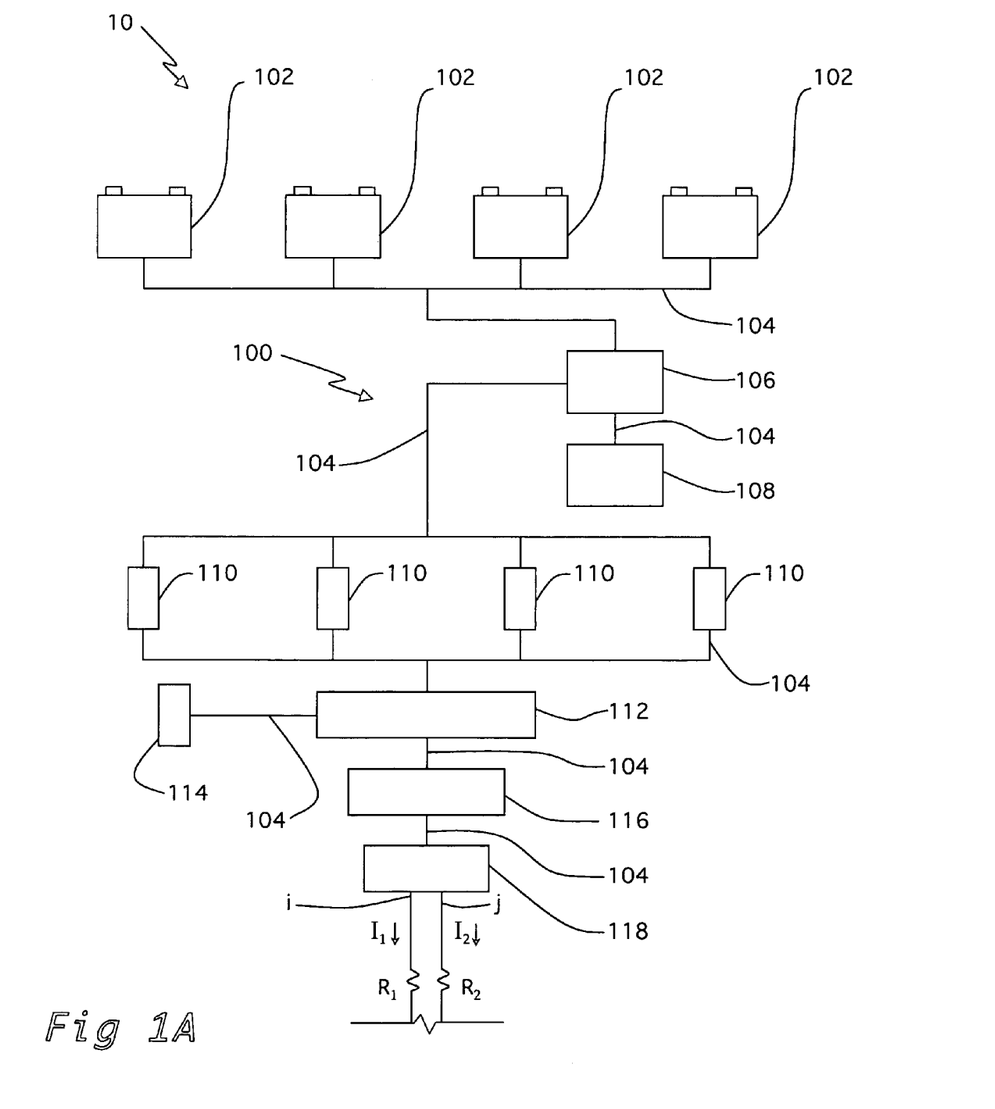
FIG. 1A is a schematic drawing showing a section of the electrical system of an electro-magnetic circular engine.

As seen in FIG. 1A, electrical system 100 comprises rechargeable batteries 102 and electrical wires 104 that electrically connect to each of the components described below. Rechargeable batteries 102 have sufficient power to start instant invention 10. Each of rechargeable batteries 102 has an electrical wire 104 that connects to starter switch 106. Starter switch 106 is connected to starter 108. Starter switch 106 connects to each of electrical coils 110 with electrical wire 104. In the preferred embodiment, each of electrical coils 110, as inverters, have means to convert 24 volts to 240 volts. Electrical coils 110 connect to a mechanical pedal 112 that connects to an electric accelerator 114. The mechanical pedal 112 is operated by a driver whereby pressing the mechanical pedal 112 increases vehicle acceleration. Recognizing pedal placement, electric accelerator 114 communicates electronically with computer 116, and computer 116 determines current to flow to distributor 118. Extending from distributor 118 are electrical wires i and j. It is also noted that distributor 118 has synchronizing means to send electrical currents to electro-magnets to switch magnetic polarity.

Figure 1B:
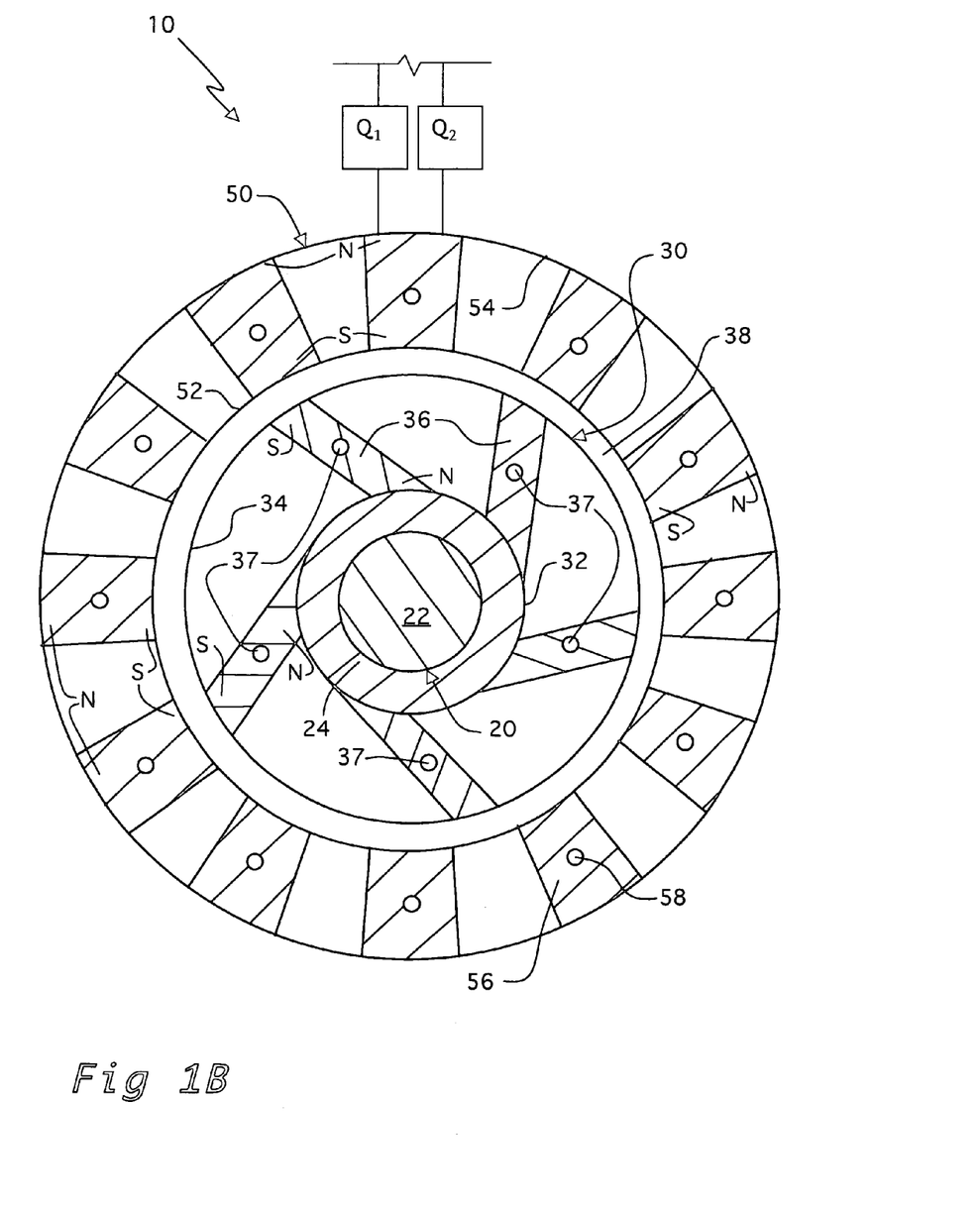
FIG. 1B represents a cross sectional view of the preferred embodiment of the electro-magnetic circular engine.

As seen in FIGS. 1A and 1B, induced currents I1 and I2 flow through their respective current limiters R1 and R2 and activate transistors Q1 and Q2 respectively. When the transistors Q1 and Q2 are activated, the currents I1 and I2 flow from distributor 118. Distributor 118 synchronizes the generation of opposite forces by sending an electrical current, defined as I1 and I2, to sensors 37 and 58 of electro-magnets 36 and 56 respectively, thus producing an opposite electro-motive force upon electro-magnets 36, thus causing electro-magnetic wheel 30 to rotate with shaft 22 in a predetermined direction. As illustrated, electro-magnets 36 and 56 have defined polarities, wherein north polarity is defined by N and the south polarity is defined by S to follow the basic principle that opposite poles attract and like poles repel each other.

Hub assembly 20 comprises shaft 22 and spacer 24. Spacer 24 serves to secure electro-magnetic wheel 30 upon shaft 22. Electro-magnetic wheel 30 comprises walls 32 and 34 that have electro-magnets 36 fixed there between. Each electro-magnets 36 has sensor 37 fixed thereon. Electro-magnetic wheel 50 comprises walls 52 and 54 that have electro-magnets 56 fixed there between. Each electro-magnet 56 has sensor 58 fixed thereon. Between electro-magnetic wheels 30 and 50 is a clearance 38.

Electro-magnetic wheel 30 is mounted upon shaft 22 and therefore rotates with shaft 22 in a predetermined direction continuous after the initial activation of the shaft 22. It is noted that electro-magnetic wheel 50 is stationary and does not rotate upon shaft 22. Initial activation of the shaft 22 can be accomplished by means of applying a short period of the force, such as from starter 108. At least three alternators, not shown, are connected to the rotating shaft 22. In the preferred embodiment, the alternators work at a minimum of 35 amps to over 600 amps each and recharge rechargeable batteries 102.

Figure 2:
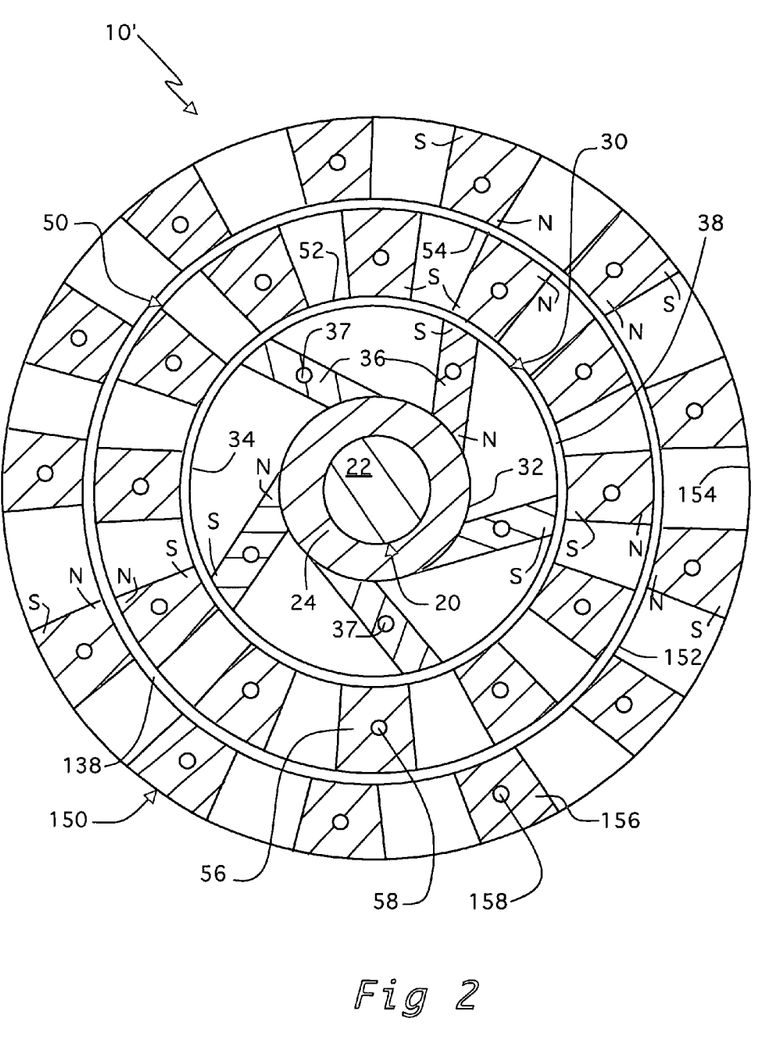
FIG. 2 represents a cross sectional view of a first alternate embodiment of the electro-magnetic circular engine.

As seen in FIG. 2, a first alternate embodiment of the instant invention is defined as 10', further comprising electro-magnetic wheel 150 in addition to hub assembly 20, electro-magnetic wheel 30, electro-magnetic wheel 50, and electrical system 100.

In the first embodiment 10', extending from distributor 118 are electrical wires i, j, plus an additional electrical wire, not seen. As in the preferred embodiment 10, distributor 118 has synchronizing means to send an electrical current to electro-magnets to switch magnetic polarity.

Similar to the preferred embodiment, induced currents flow through their respective current limiters and activate transistors respectively. When the transistors are activated, the currents flow from distributor 118. Distributor 118 synchronizes the generation of opposite forces by sending an electrical current to sensors 37; 58; and 158 of electro-magnets 36; 56; and 156 respectively, thus producing an opposite electro-motive force upon electro-magnets 36, thus causing electro-magnetic wheel 30 to rotate with shaft 22 in a predetermined direction. In addition, electro-magnetic wheel 150 is connected to shaft 22 via clutch 151, seen in FIG. 4, allowing electro-magnetic wheel 150 to rotate upon shaft 22. As illustrated, electro-magnets 36; 56; and 156 have defined polarities, wherein north polarity is defined by N and the south polarity is defined by S to follow the basic principle that opposite poles attract and like poles repel each other.

Electro-magnetic wheel 150 comprises walls 152 and 154 that have electro-magnets 156 fixed there between. Each electro-magnets 156 has a sensor 158 fixed thereon. Between electro-magnetic wheels 50 and 150 is a clearance 138.

Electro-magnetic wheels 30 and 150 rotate upon shaft 22 in a predetermined direction continuous after the initial activation of the shaft 22. It is noted that electro-magnetic wheel 50 is stationary and does not rotate upon shaft 22. Initial activation of the shaft 22 can be accomplished by means of applying a short period of the force, such as from starter 108. At least three alternators, not shown, are connected to the rotating shaft 22. In the preferred embodiment, the alternators work at a minimum of 35 amps to over 600 amps each and recharge rechargeable batteries 102.

It is noted that the first embodiment 10' produces greater rotational force upon shaft 22 than the preferred embodiment defined as 10, since distributor 118 synchronizes the generation of opposite forces by sending an electrical current to each of electro-magnets 36; 56; and 156, thus producing an opposite electro-motive force so as to force electro-magnetic wheels 30 and 150 to rotate upon shaft 22.

Figure 3:
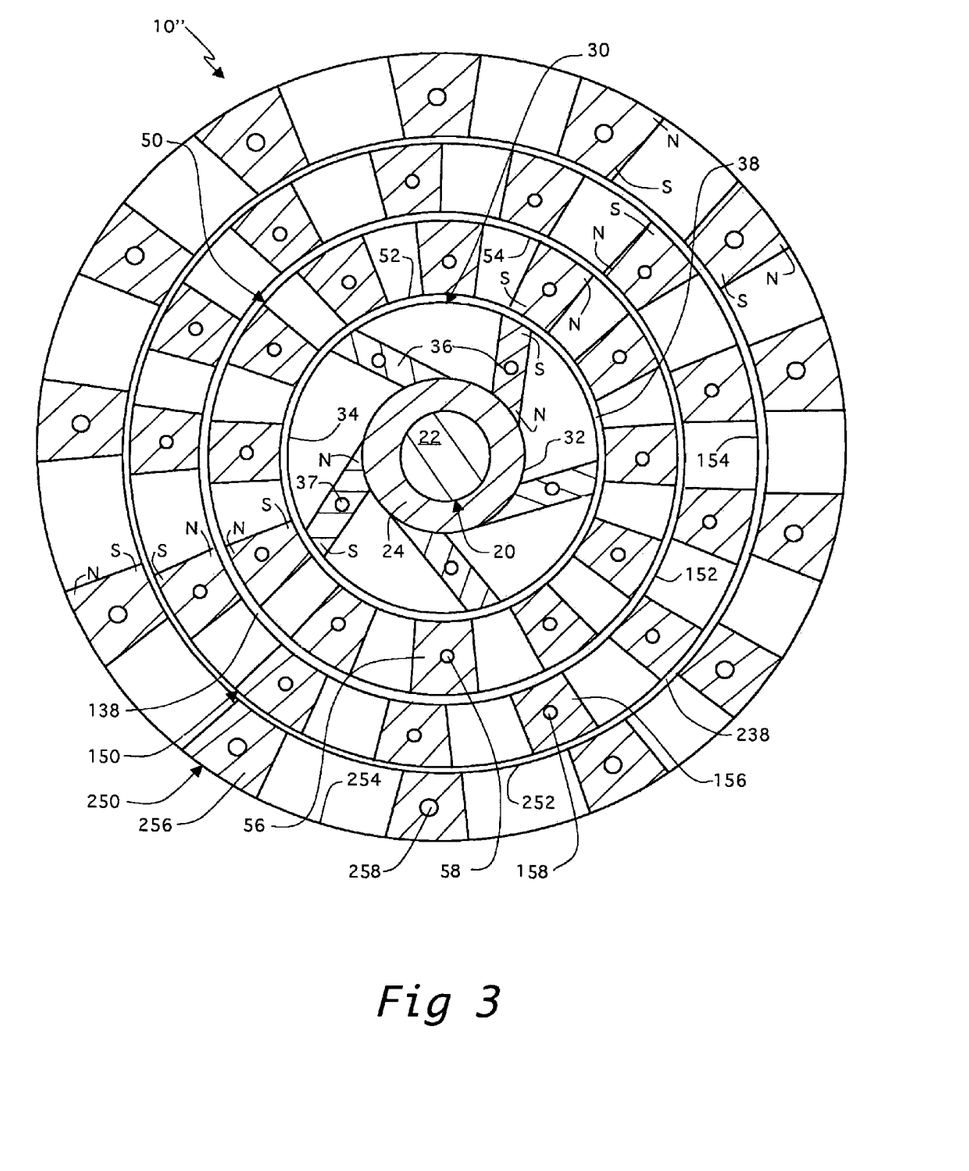
FIG. 3 represents a cross sectional view of a second alternate embodiment of the electro-magnetic circular engine.

As seen in FIG. 3, a second alternate embodiment of the instant invention is defined as 10", further comprising electro-magnetic wheel 250 in addition to electro-magnet wheel 150, hub assembly 20, electro-magnetic wheel 30, electro-magnetic wheel 50, and electrical system 100.

In this second embodiment 10", extending from distributor 118 are electrical wires i, j, plus two additional electrical wires, not seen. As in the preferred embodiment 10, distributor 118 has synchronizing means to send an electrical current to electro-magnets to switch magnetic polarity.

Similar to the preferred embodiment, induced currents flow through their respective current limiters and activate transistors respectively. When the transistors are activated, the currents flow from distributor 118. Distributor 118 synchronizes the generation of opposite forces by sending an electrical current to sensors 37; 58; 158; and 258 of electro-magnets 36; 56; 156; and 256 respectively, thus producing an opposite electro-motive force so as to force electro-magnetic wheel 30 to rotate upon shaft 22 in a predetermined direction. In addition, electro-magnetic wheel 150 is connected to shaft 22 via clutch 151, seen in FIG. 4, allowing electro-magnetic wheel 150 to rotate upon shaft 22. As illustrated, electro-magnets 36; 56; 156; and 256 have defined polarities, wherein north polarity is defined by N and the south polarity is defined by S to follow the basic principle that opposite poles attract and like poles repel each other.

Electro-magnetic wheel 250 comprises walls 252 and 254 that have electro-magnets 256 fixed there between. Each electro-magnets 256 has a sensor 258 fixed thereon. Between electro-magnetic wheels 150 and 250 is a clearance 238.

Electro-magnetic wheels 30 and 150 rotate upon shaft 22 in a predetermined direction continuous after the initial activation of the shaft 22. It is noted that electro-magnetic wheels 50 and 250 are stationary and do not rotate upon shaft 22. Initial activation of the shaft 22 can be accomplished by means of applying a short period of the force, such as from starter 108. At least three alternators, not shown, are connected to the rotating shaft 22. In the preferred embodiment, the alternators work at a minimum of 35 amps to over 600 amps each and recharge rechargeable batteries 102. It is noted that the second embodiment 10" produces greater rotational force upon shaft 22 than the first alternate embodiment defined as 10', since distributor 118 synchronizes the generation of opposite forces by sending an electrical current to each of electro-magnets 36; 56; 156; and 256, thus producing an opposite electro-motive force so as to force electro-magnetic wheels 30 and 150 to rotate upon shaft 22.

Figure 4:
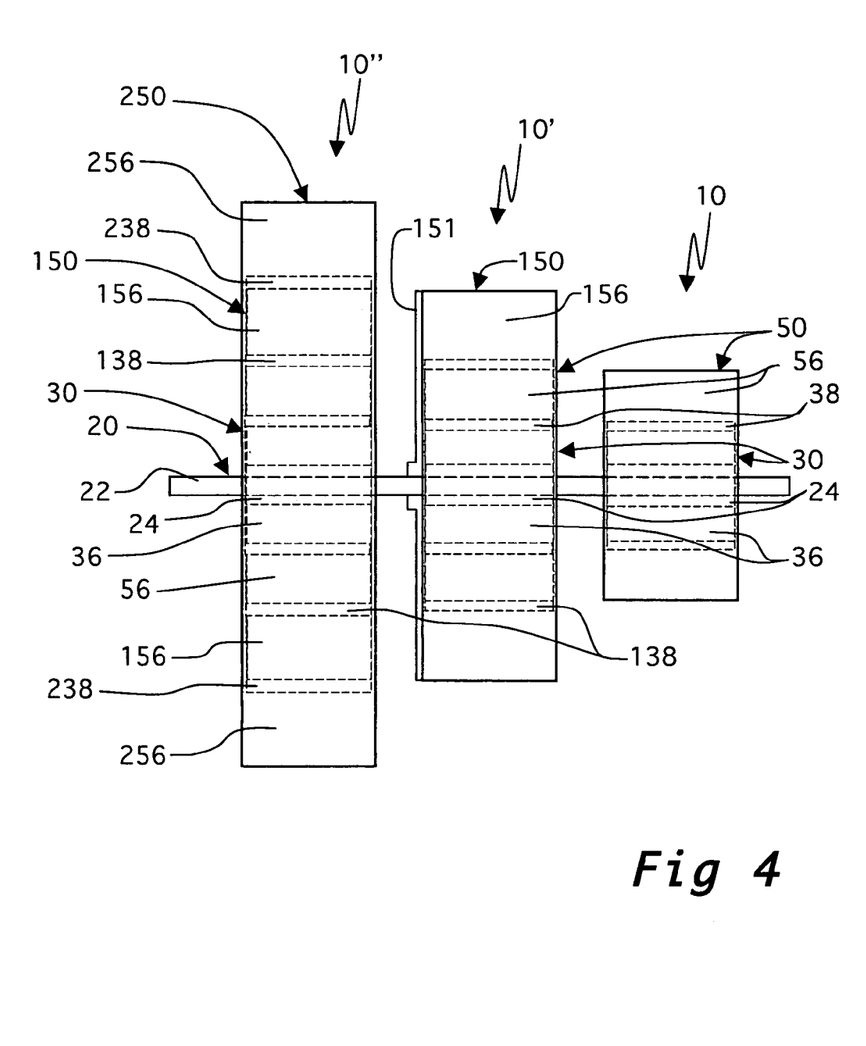
FIG. 4 represents a cross sectional view of a third alternate embodiment of the electro-magnetic circular engine.

Seen in FIG. 4 is a third alternate embodiment of the instant invention illustrating a plurality of electro-magnetic wheels mounted upon a single shaft 22 that may comprise a single electrical system 100. When desired, a user may engage the plurality of electro-magnetic wheels in series to increase rotational force upon shaft 22 for power and/or velocity.

Figure 5:
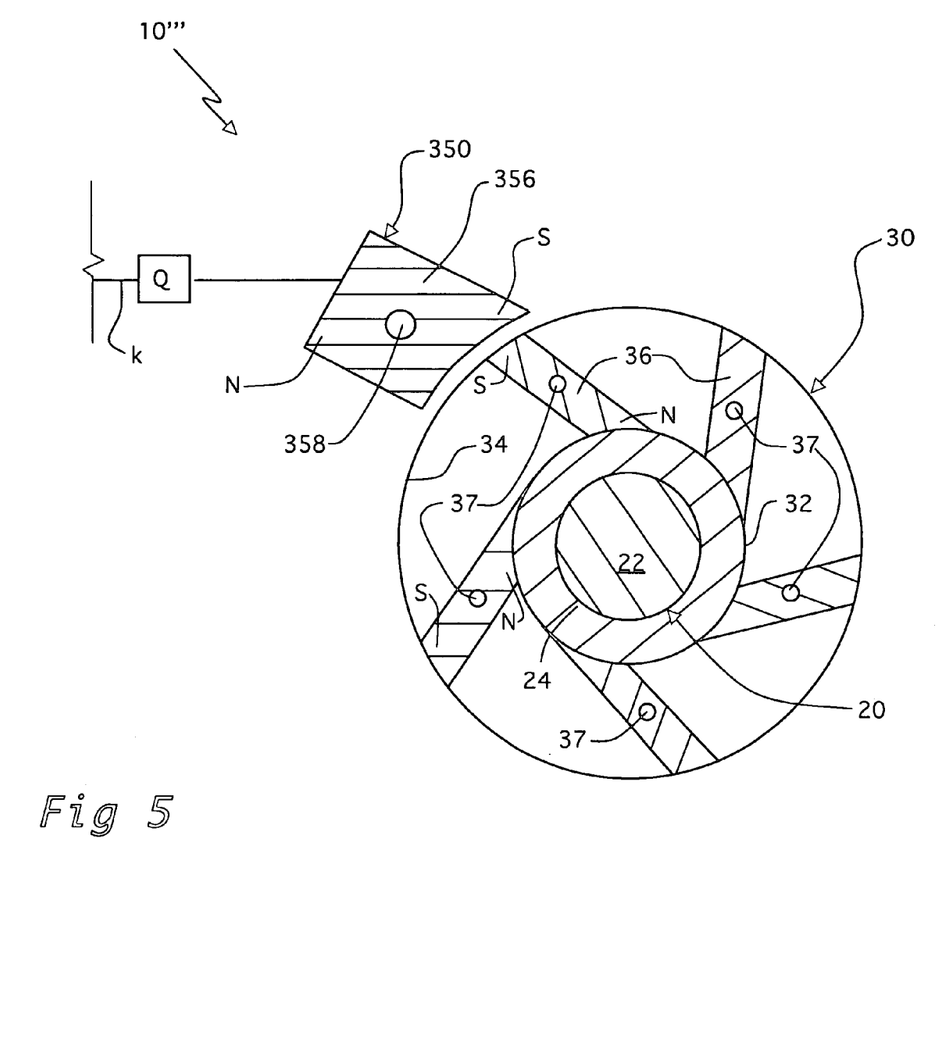
FIG. 5 represents a cross sectional view of a fourth alternate embodiment of the electro-magnetic circular engine.

As seen in FIG. 5, a fourth alternate embodiment of the instant invention is defined as 10''', comprising electro-magnet 350 in addition to hub assembly 20, electro-magnetic wheel 30, and electrical system 100.

In this fourth embodiment 10''', extending from distributor 118 is an electrical wire k. As in the preferred embodiment 10, distributor 118 has synchronizing means to send an electrical current to electro-magnets to switch magnetic polarity.

Similar to the preferred embodiment, induced currents flow through their respective current limiters and activate transistors respectively. When the transistors are activated, the currents flow from distributor 118. Distributor 118 synchronizes the generation of opposite forces by sending an electrical current to sensors 37 and 358 of electro-magnets 36 and 356 respectively, thus producing an opposite electro-motive force upon electro-magnets 36, thus causing electro-magnetic wheel 30 to rotate with shaft 22 in a predetermined direction. As illustrated, electro-magnets 36 and 356 have defined polarities, wherein north polarity is defined by N and the south polarity is defined by S to follow the basic principle that opposite poles attract and like poles repel each other.

Electro-magnetic wheel 30 rotates upon shaft 22 in a predetermined direction continuous after the initial activation of the shaft 22. Initial activation of the shaft 22 can be accomplished by means of applying a short period of the force, such as from starter 108. At least three alternators, not shown, are connected to the rotating shaft 22. In the preferred embodiment, the alternators work at a minimum of 35 amps to over 600 amps each and recharge rechargeable batteries 102.

It is noted that the electro-magnetic circular engine 10 is manufactured of demagnetized material. It is important to note that the instant invention 10 requires scheduled maintenance and replacement of electro-magnets 36; 56; 156; and 256 at predetermined time intervals to maintain predetermined electro-motive forces to properly operate. It is noted that the instant invention also comprises a separate cooling system and an engine oil system for lubrication and cooling that have not been illustrated for simplification.

This invention is suitable to be used with any application requiring an engine, such as an automobile in the preferred embodiment; however, other embodiments of the present invention may be suitable for vehicles such as, but not limited to: airplanes, trucks, jeeps, motorcycles, scooters, vans, and water vessels. In alternative embodiments, the instant invention may be implemented with DC or AC current for tools, electrical appliances, pumps, heating systems, generators, toys, and in electrical plants to produce electricity.

Traditional components such as timing chains, gears etc. have not been depicted and only a portion of the mechanism means has been illustrated enough to describe the invention. It is understood that these components will be part of the final embodiment. It is to be understood that variation in these elements of structure to obtain the same results is within the scope of the invention.

As can be readily understood from the foregoing description of the invention, the present structure can be configured in different modes to provide the ability to construct an electro-magnetic circular engine. Accordingly, the foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electro-magnetic circular engine, comprising;
   A) a hub assembly;
   B) a first electro-magnetic wheel rotatably mounted on said hub assembly, said first electro-magnetic wheel comprising first electro-magnets;
   C) a second electro-magnetic wheel surrounding said first electro-magnetic wheel, said second electro-magnetic wheel comprising second electro-magnets;
   D) electro-magnetic means, said electro-magnetic means consisting of a distributor having first synchronizing means to send an electrical current to said first and second electro-magnets, said electro-magnetic means generate an electro-motive force between said first and second electro-magnets when synchronized by said distributor, wherein engaging magnetic polarity between said first and second electro-magnets forces said first electro-magnetic wheel to rotate with said hub assembly in a predetermined direction continuous after an initial activation of said electro-magnetic means by applying a short period of an electrical force to said hub assembly;
   E) electrical means comprising an electrical connection and a source of rechargeable battery power for supplying said rechargeable battery power for said short period of an electrical force and said electrical means further comprising said source of rechargeable battery power having said electrical connection to a starter switch, said electrical means further comprising said starter switch having said electrical connection to a starter, and said electrical means further comprising said starter switch having said electrical connection to at least one electrical coil, said electrical coil being an inverter, and having means to convert 24 volts DC to 240 volts AC, said electrical means further comprising said at least one electrical coil having said electrical connection to a mechanical pedal that is operated by a driver for acceleration, said mechanical pedal having said electrical connection to an electric accelerator, said mechanical pedal having said electrical connection to a computer, said computer having said electrical connection to said distributor, and said short period of an electrical force derives from a starter;

F) a third electro-magnetic wheel rotatably mounted on said hub assembly, said third electro-magnetic wheel comprising third electro-magnets;

G) said electro-magnetic means further having second synchronizing means to send an electrical current to said first, second, and third electro-magnets, said electro-magnetic means generate said electro-motive force between said first, second, and third electro-magnets when synchronized by said distributor, wherein engaging magnetic polarity between said first, second, and third electro-magnets forces said first and third electro-magnetic wheels to rotate with said hub assembly in a predetermined direction continuous after an initial activation of said electro-magnetic means by applying said short period of said electrical force;

H) a fourth electro-magnetic wheel surrounding said third electro-magnetic wheel, said fourth electro-magnetic wheel comprising fourth electro-magnets, said fourth electro-magnets comprising sensors to receive said electrical current via said electro-magnetic means;

I) said electro-magnetic means further having third synchronizing means to send an electrical current to said first, second, third, and fourth electro-magnets, said electro-magnetic means generate said electro-motive force between said first, second, third, and fourth electro-magnets when synchronized by said distributor, wherein engaging magnetic polarity between said first, second, third, and fourth electro-magnets forces said first and third electro-magnetic wheels to rotate with said hub assembly in a predetermined direction continuous after an initial activation of said electro-magnetic means by applying said short period of said electrical force, and said first, second, third, and fourth electro-magnets each comprise sensors to receive said electrical current via said electro-magnetic means; and J) at least three alternators connected to said hub assembly, said at least three alternators work at a minimum of 35 amps to over 600 amps each and recharge said rechargeable battery power.

2. The electro-magnetic circular engine set forth in claim 1, further characterized in that said first, second, third, and fourth electro-magnets requires scheduled maintenance and replacement at predetermined time intervals to maintain predetermined said electro-motive forces.

3. The electro-magnetic circular engine set forth in claim 2, further comprising a cooling system and an engine oil system for lubrication and cooling.

* * * * *